US006721412B1

United States Patent
Youngs

(10) Patent No.: US 6,721,412 B1
(45) Date of Patent: Apr. 13, 2004

(54) METHOD OF COORDINATING A CALL AMONG MULTIPLE DEVICES

(75) Inventor: Edward A. Youngs, Boulder, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/567,297

(22) Filed: May 8, 2000

(51) Int. Cl.[7] ................................................ H04M 3/42
(52) U.S. Cl. ....................... 379/204.01; 379/206.01; 379/211.04; 379/142.04
(58) Field of Search ..................... 379/214.01, 142.01, 379/142.04, 72, 202.01, 204.01, 206.01, 211.04; 455/414, 415, 416, 462, 463

(56) References Cited

U.S. PATENT DOCUMENTS

| | | | | |
|---|---|---|---|---|
| 4,125,748 A | * | 11/1978 | Nahabedian et al. | 379/158 |
| 4,603,236 A | * | 7/1986 | Smith et al. | 379/214.01 |
| 4,646,346 A | * | 2/1987 | Emerson et al. | 379/214.01 |
| 5,027,341 A | * | 6/1991 | Jarvis et al. | 370/235 |
| 5,027,384 A | * | 6/1991 | Morganstein | 379/207.05 |
| 5,200,996 A | * | 4/1993 | Beierle | 370/384 |
| 5,548,636 A | * | 8/1996 | Bannister et al. | 379/390.01 |
| 6,263,071 B1 | * | 7/2001 | Swan et al. | 379/199 |
| 6,304,649 B1 | * | 10/2001 | Lauzon et al. | 379/211.01 |
| 6,381,323 B1 | * | 4/2002 | Schwab et al. | 379/211.02 |
| 6,405,037 B1 | * | 6/2002 | Rossmann | 455/426 |
| 6,442,245 B1 | * | 8/2002 | Castagna et al. | 379/88.12 |
| 6,496,578 B1 | * | 12/2002 | Chen et al. | 379/211.02 |
| 6,535,730 B1 | * | 3/2003 | Chow et al. | 455/416 |

* cited by examiner

Primary Examiner—Ahmad F. Matar
Assistant Examiner—Rasha S. Al-Aubaidi
(74) Attorney, Agent, or Firm—Brooks Kushman P.C.

(57) ABSTRACT

A method of coordinating an incoming call among a plurality of telephony devices includes generating an incoming call notification signal and a call status signal at each telephony device. In the presence of the incoming call, the incoming call notification signal is generated at each telephony device. Upon answering of the incoming call at an answering telephony device of the plurality of telephony devices, the call status signal is generated at each telephony device to inform a user of a status of the answered call.

10 Claims, 4 Drawing Sheets

METHOD OF COORDINATING A CALL AMONG MULTIPLE DEVICES

TECHNICAL FIELD

The present invention relates to a method of coordinating an incoming call among a plurality of telephony devices.

BACKGROUND ART

With the advent and proliferation of mobile phone devices, both cordless (low power, limited range) and cellular, individuals frequently alternate in their use of particular phones. That is, individuals may use a fixed location wire line phone while in their kitchen or office, a cordless phone while moving about, and a cellular phone while in the car or outdoors. In order to provide calling parties the convenience of not needing to know which of several phones their intended called party is located nearest to, various mechanisms are available to coordinate the successful completion of calls.

For example, several wire line and cordless phones may share a single line number and physical connection to the network, that is, be extensions of the same line and number. When an incoming call rings, it may ring extensions in several locations simultaneously. Ringing several locations simultaneously makes it more convenient for the calling party to reach the called party when the calling party does not know the location of the called party. However, ringing several locations simultaneously increases the likelihood that an unintended party answers the incoming call. Sometimes, the unintended party that answers the incoming call may complete the call by audibly or visibly alerting the intended party, for example, by saying "this call is for you." For example, when an unintended party answers an extension located downstairs in the home, the party may complete the call by telling the intended party to "get the phone."

In order to extend the convenience of multiple extensions to cellular users and other users that do not remain in one location, functionally similar but technically different mechanisms are available to maximize convenience and completions. For example, call forwarding on busy or don't answer, active on either a cellular or wire line phone, forwards an incoming call directed to one phone (which is busy or not answered) to another phone which may be answered. This mechanism is one of many available and frequently used today.

A drawback of the currently available mechanisms such as call forwarding on busy or don't answer is that users simultaneously located at different extensions may have no way of coordinating the taking of an incoming call. Particularly, when the different locations are out of sight or earshot of each other, there is no simple way of coordinating the taking of an incoming call. For example, if one user is upstairs or in the next office and the other is nearby, the first can answer the call and shout to the other, "this call is for you!" However, if the user for whom the call is intended is at a distant extension, other users near ringing extensions may have no way of knowing either whether the call is answered or by whom. Furthermore, if an unintended recipient answers the call, he or she may have no way of alerting the intended recipient. For the wireline network, there are a few mechanisms available that address this problem. For example, intercom buzzers may be used to alert other extensions of a call, but these intercom buzzer systems are not widely used due to their cost or other factors.

For the foregoing reason, there is a need for a method and system of coordinating an incoming call among a plurality of telephony devices that overcomes the limitations of the prior art.

DISCLOSURE OF INVENTION

It is, therefore, an object of the present invention to provide a method of coordinating an incoming call among a plurality of telephony devices that generates call status signals at the telephony devices to inform users of a status of an answered call.

In carrying out the above object, a method of coordinating an incoming call among a plurality of telephony devices is provided. The method comprises, in the presence of the incoming call, generating an incoming call notification signal at each telephony device. The method further comprises, upon answering of the incoming call at an answering telephony device of the plurality of telephony devices, generating a call status signal at each telephony device to inform a user of a status of the answered call.

In a preferred embodiment, several of the following features are included. Preferably, the call status signal indicates the answering telephony device. Preferably, generating the call status signal at each telephony device further comprises generating an add prompt at the answering telephony device. The add prompt is generated to allow a user at the answering telephony device to select a different telephony device. In response to selection of a different telephony device at the add prompt, an incoming call signal is generated at the selected different telephony device. Preferably, a caller identity corresponds to the incoming call and the incoming call notification signal includes the caller identity. In some embodiments, the plurality of telephony devices share a single telephone number. The call status signal may include a visual signal and/or an audible signal. Each telephony device may have a device type, and the visual and/or audible signal may be based in part on the device type.

In a preferred embodiment, generating the call status signal at each telephony device further comprises generating a join prompt at a non-answering telephony device to allow a user at the non-answering telephony device to request to join the call. In response to a request to join the call at the join prompt, the non-answering telephony device is added to the call.

Further, in carrying out the present invention, a method of coordinating an incoming call among the plurality of telephony devices sharing a telephone number is provided. The method comprises, in the presence of the incoming call, generating an incoming call notification signal at each telephony device, and upon answering of the incoming call at an answering telephony device of the plurality of telephony devices, generating a call status signal at each telephony device to inform the user of a status of the answered call. The call status signal indicates the answering telephony device. The method further comprises generating an add prompt at the answering telephony device to allow a user at the answering telephony device to select a different telephony device, and in response to selection of a different telephony device at the add prompt, generating an incoming call signal at the selected different telephony device.

A plurality of telephony devices may share a single physical telephone line. Alternatively, the plurality of telephony devices may include at least one wireless device. In a preferred embodiment, generating the call status signal at each telephony device further comprises generating a join prompt at a non-answering telephony device to allow a user at the non-answering telephony device to request to join the call. In response to a request to join the call at the join prompt, the non-answering telephony device is added to the call.

Further, in carrying out the present invention, a system for coordinating an incoming call among a plurality of telephony devices is provided. The system comprises a plurality of telephony devices sharing a telephone number. Each telephony device is programmed to, in the presence of the incoming call, generate an incoming call notification signal and to, upon answering of the incoming call at an answering telephony device of the plurality of telephony devices, generate a call status signal to inform a user of a status of the answered call.

Preferably, the call status signal indicates the answering telephony device. Further, preferably, the answering telephony device is programmed to generate the call status signal by generating an add prompt to allow a user at the answering telephony device to select a different telephony device, and in response to selection of a different telephony device at the add prompt, communicating an incoming call signal to the selected different telephony device. In some implementations, the plurality of telephony devices share at least one physical telephone line.

Even further, in carrying out the present invention, a telephony device for coordinating an incoming call among a plurality of telephony devices sharing a telephone number is provided. The telephony device comprises a telephone. The telephone is programmed to, in the presence of the incoming call, generate an incoming call notification signal and to, upon answering of the incoming call at an answering telephony device of the plurality of telephony devices, generate a call status signal to inform a user of a status of the answered call. The call status signal indicates the answering telephony device. The telephone is further programmed to generate an add prompt when the telephone is the answering telephony device to allow the user to select a different telephony device, and to, in response to selection of a different telephony device at the add prompt, communicate an incoming call signal to the selected different telephony device.

The advantages associated with embodiments of the present invention are numerous. For example, embodiments of the present invention coordinate an incoming call among a plurality of telephony devices, which may include fixed location wire line phones, cordless phones, cellular phones, and even other devices such as pagers and the like. Embodiments of the present invention provide visual displays and/or audible tones that allow users of associated wireless and/or wire line telephony devices to coordinate use at arbitrary distances as if they were in visual or audible contact. That is, multiple telephony devices, possibly including both wireless and wire line devices, are synchronized. In preferred embodiments, embodiments of the present invention provide a mechanism for conveying to users of non-answering extensions, information about the answering of a call at another, possibly distant extension. Furthermore, embodiments of the present invention provide a mechanism for signaling between users from one extension to another.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
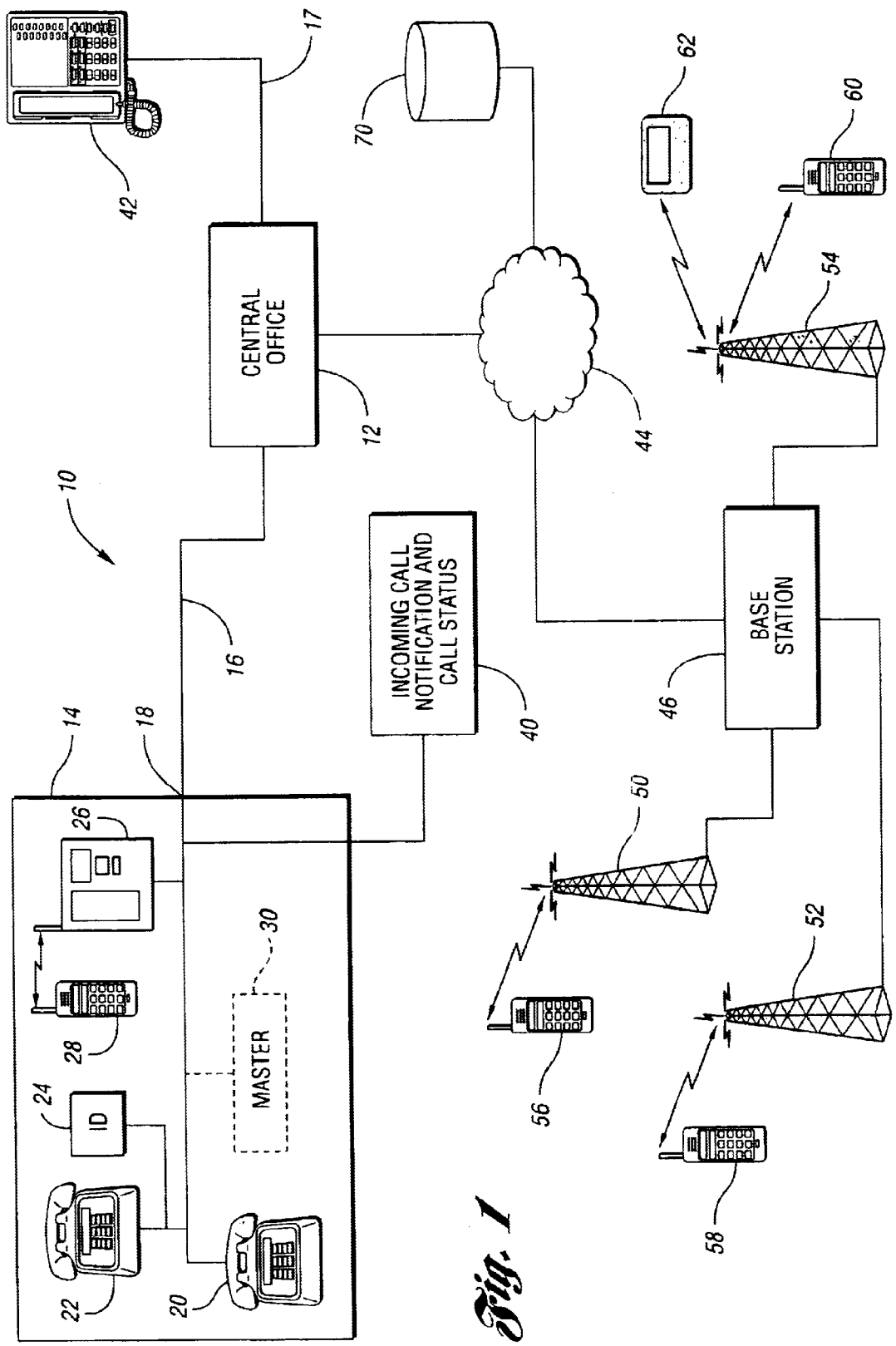
FIG. 1 is a wire line and wireless telephone network along with a plurality of telephony devices that are coordinated in accordance with a method of the present invention.

With reference to FIG. 1, a telephone network is generally indicated at 10. It is appreciated that embodiments of the present invention are not limited to any particular implementation for the telephone network, and that the network illustrated herein is illustrated to facilitate an understanding of the present invention. A central office 12 has numerous telephone lines extending therefrom. The telephone lines extend into neighborhoods and into customer homes. Generally, a bundle of telephone lines leaves central office 12, and branches out to a plurality of homes, with a home typically receiving two lines (four wires forming two twisted pairs). Of course, in accordance with the present invention, any number of pairs may extend to a particular end user. As shown, residence 14 receives a telephone line 16 from central office 12. A network interface 18 separates the telephone company phone line 16 from the internal wiring within residence 14. Within residence 14, a number of different devices are connected to telephone line 16. As shown, telephone 20, telephone 22 with caller identification unit 24, and cordless telephone base unit 26 are all connected to telephone line 16. A cordless telephone 28 communicates with cordless telephone base unit 26. In accordance with the present invention, telephony devices 20, 22, 26 (and any number of others) are coordinated via incoming call notification signals and call status signals, as indicated at block 40. The telephony devices may be coordinated in a peer-to-peer fashion, or in the alternative, an optional master device 30 may be connected to the telephone line to master the coordination of the various telephony devices. Further, in a straightforward application, all the telephony devices are located on the same physical telephone line. In the alternative, multiple telephone lines may be located within residence 14 and a suitable device may provide communication between devices on different lines.

In accordance with the present invention, in the presence of an incoming call, an incoming call notification signal is generated at each telephony device 20, 22, 26. Further, upon answering of the incoming call at an answering telephony device of the plurality of telephony devices 20, 22, 26, a call status signal is generated at each telephony device to inform a user of a status of the answered call. That is, when a call is present on line 16, all devices ring. When the call is answered at one of the devices, the other devices receive a call status signal to inform any user at these other devices of the answered call. It is appreciated that there are many variations possible for embodiments of the present invention, with several specific examples being illustrated herein.

With continuing reference to FIG. 1, the telephony devices that are coordinated with the incoming call notification and call status information are not limited to a single physical line, and further, are not limited to residence 14. For example, telephone line 17 from central office 12 is connected to telephone 42, which may be a work telephone. Telephone lines 16 and 17 may be configured at central office 12 so as to function as a single virtual telephone line with the same telephone number. In turn, incoming call notification and call status information is provided to telephone 42. Even further, the plurality of telephony devices that are coordinated may include one or more wireless devices. Central office 12 is connected to network cloud 44. Base station 46 of a wireless telephone network is also connected to network cloud 44. It is appreciated that the details of the communication between central office 12 and base station 46 are not shown herein, but are understood by those skilled in the art of wire line and wireless communication networks. Base station 46 communicates with wireless network transmitters 50, 52, 54. Wireless devices 56, 58, 60 communicate with transmitters 50, 52, 54, respectively, over the wireless network. In accordance with the present invention, any of the wireless devices may also receive the incoming call notification and call status information that is received by telephony devices on telephone line 16 and optionally by telephone devices on line 17. Even further, various types of telephony devices other than traditional telephones may be include in the coordinated devices. For example, a pager 62 communicates over the wireless network and may be coordinated with the various coordinated telephones. That is, call notification status signals may be presented to the user in a way appropriate for the particular device being used. A telephone may be provided with a small display screen, where a pager may have a more simplified display screen with more limited capabilities. That is, each telephony device in the group of coordinate devices has a device type, and the visual and/or audible signals from the device are based in part on the device type.

It is to be appreciated that embodiments of the present invention coordinate an incoming call among a plurality of telephony devices that may include fixed wire line telephones, cordless wire line telephones, wireless telephones, and other devices such as pagers. The devices in a straightforward implementation are all located on a single physical drop from the central office, but may be located on different physical lines configured as a single virtual telephone line having one or more telephone numbers, and may be configured across multiple networks such as including devices on both the wire line and the wireless network. Depending on a particular implementation, appropriate signaling logic generates incoming call notification signals at the telephony devices, and generates call status signals. In a straightforward implementation where the telephone devices include a number of different devices on a single physical telephone line, the devices may be implemented in a peer-to-peer network structure with control logic located at each device to generate incoming call notification and call status signals. Alternatively, a master device may control the signaling, with the individual telephones being slaved to master 30. In a more complex implementation involving multiple physical lines and even multiple networks, an intelligent database 70 may control the signaling to the different telephony devices of the group, in addition to any number of master devices for specific subgroups of telephony devices. It is appreciated that the signaling in any of these implementations is not limited to the signaling normally used for the particular type of device. For example, fixed wire line devices within a residence 14 may operate in a normal fashion over the telephone line to communicate typical telephone call information, while utilizing a suitable wireless protocol for communicating the call status signal information among a group of devices. For example, each device may be equipped with a wireless Ethernet network adaptor for communicating call status information among the devices, while using a normal phone line connection for the actual phone call. Of course, this is just one example, and one skilled in the art appreciates that there are many possibilities. The remaining figures illustrate an exemplary implementation of the present invention. The telephones are shown as either a cordless or wireless telephone for simplicity, and the various extensions could be wireline, wireless, etc.

Figure 2A:
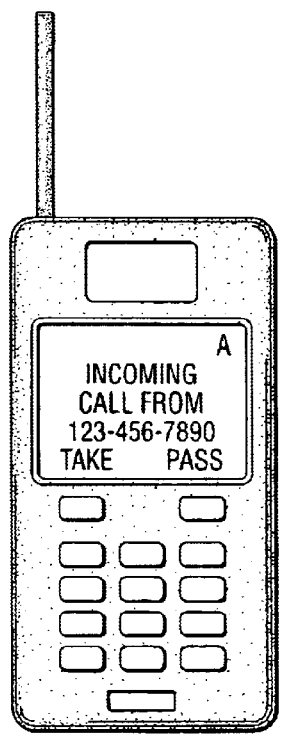
FIGS. 2A–C, 3A–C, 4A–C, 5A–C, and 6A–C illustrate telephony devices having visual displays for displaying call status signals to inform a user of a status of a telephone call in accordance with the present invention.
Figure 2B:
Figure 2C:
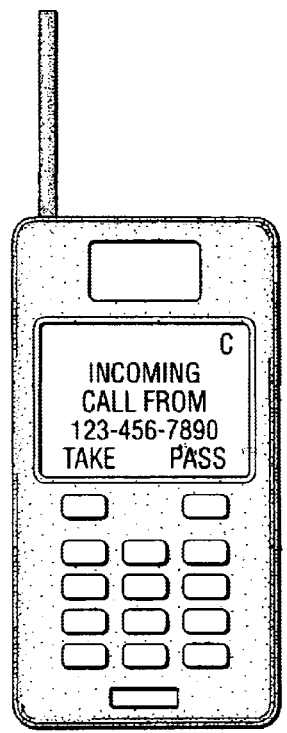

In FIGS. 2A–C, three telephones (extensions A, B, C) are shown. Extensions A, B, and C are indicated at 80, 82, 84, respectively. In the presence of an incoming call, the incoming call is coordinated by generating an incoming call notification signal at each telephony device. In the illustrated example, the signal is in the form of text on a small display. Each display notifies a user of the incoming call, and optionally notifies the user of a caller identification in the form of a number and/or a name. Further, the user is presented with options, such as an option to take the call or to ignore the call (pass). The scenario in FIGS. 2A–C illustrates the simultaneous signaling to all extensions, any (or all) of which can answer the call. Preferably, available options display as soft key labels, and are a function of the particular terminal. In cases where different extensions have different terminal capabilities, the same signaling results in different (or no) displays, appropriate to the capabilities and programming of the particular terminals. Each extension receives notification of the incoming call, but the actions taken by each extension may differ depending on the particular device and its configuration.

Figure 3A:
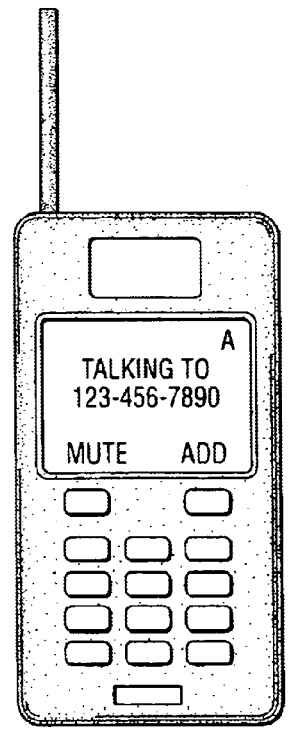
Figure 3B:
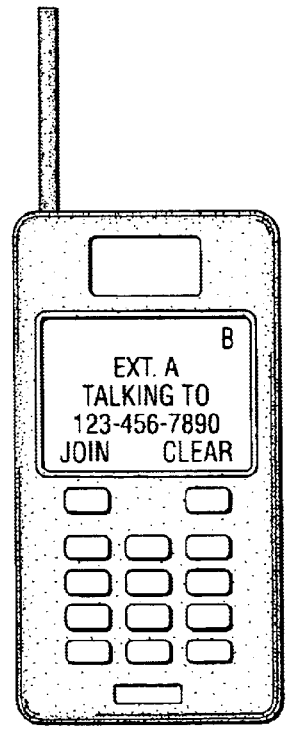
Figure 3C:
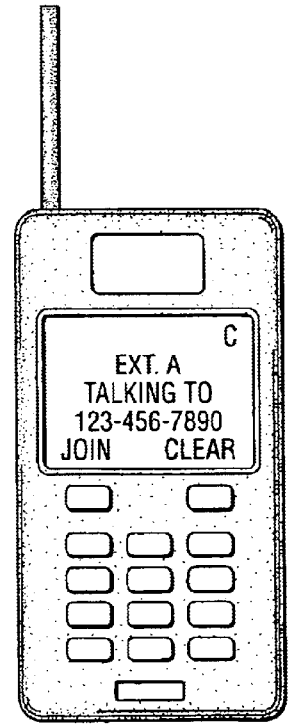

In FIGS. 3A–C, extension A, B, C are indicated at 90, 92, 94, respectively. Extension A has answered the phone call, and is given the option to mute the talk path or add another party. Extensions B and C are notified of the call status, and given the options to join the call or clear the display. That is, in the example, based on the calling number (or name), or other situational factors, user A has answered the call. The telephone system detects the answering by extension A and signals the other terminals appropriately. The other terminals display option and status appropriate to their status and capabilities.

Figure 4A:
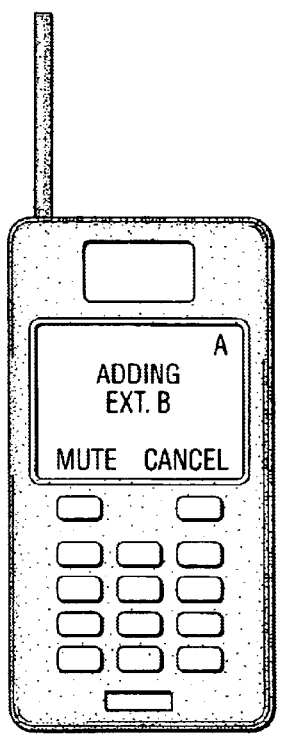
Figure 4B:
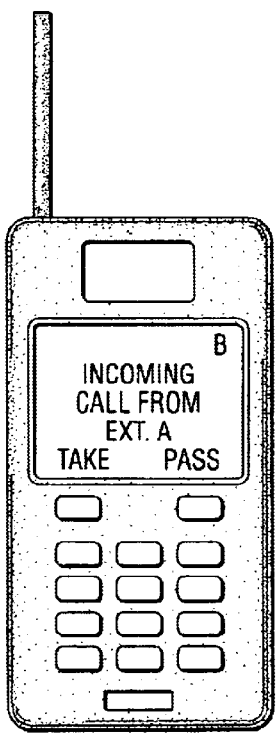
Figure 4C:
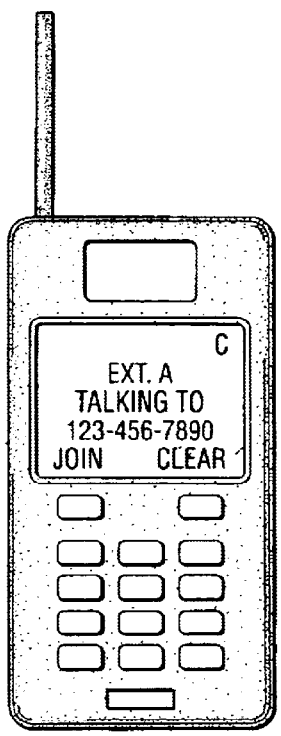

In FIGS. 4A–C, extensions A, B, C are indicated at 100, 102, 104, respectively. In the example, after conferring with the caller, the user of extension A decides to add extension B to the telephone call. The user of extension A, via a number of interactive steps, rings extension B, and the status of extension A and B are updated by signaling in terminal software. Again, all terminals dynamically display status and options appropriate to their status and capabilities.

Figure 5A:
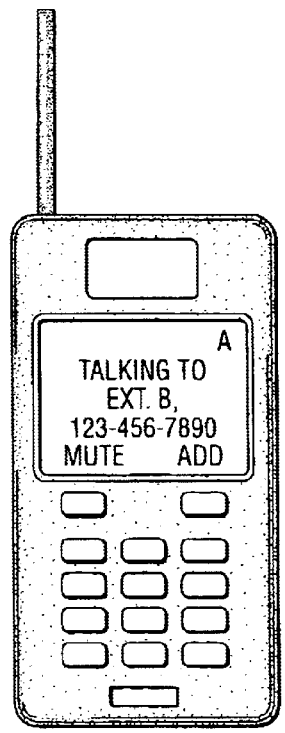
Figure 5B:
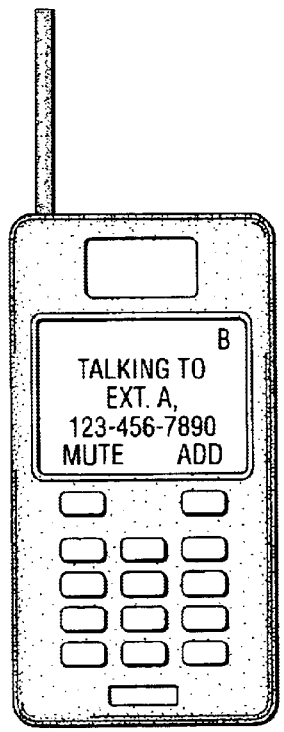
Figure 5C:
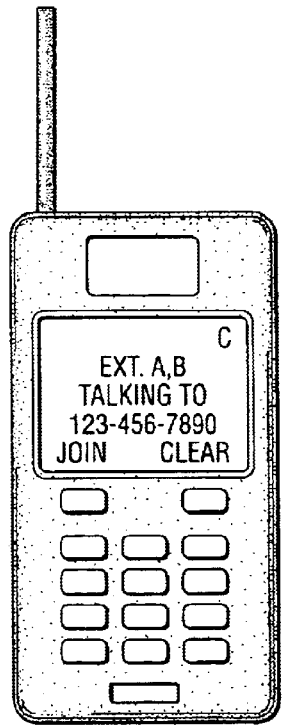

In FIGS. 5A–C, extension B takes the call from extension A, joining the call with the original caller. Both extensions A and B are given the option to mute the talk path or add yet another caller. In FIGS. 5A–C, extensions A, B, C are indicated at 110, 112, 114, respectively. The display for extension C shows that both A and B are talking to the incoming caller, with C being given the option to join the call or clear the talk path. That is, once the user of extension B answers, all terminals are appropriately signaled, and display status and options are dynamically updated as appropriate for each extension's present status and capabilities.

Figures 6A, 6B, 6C:
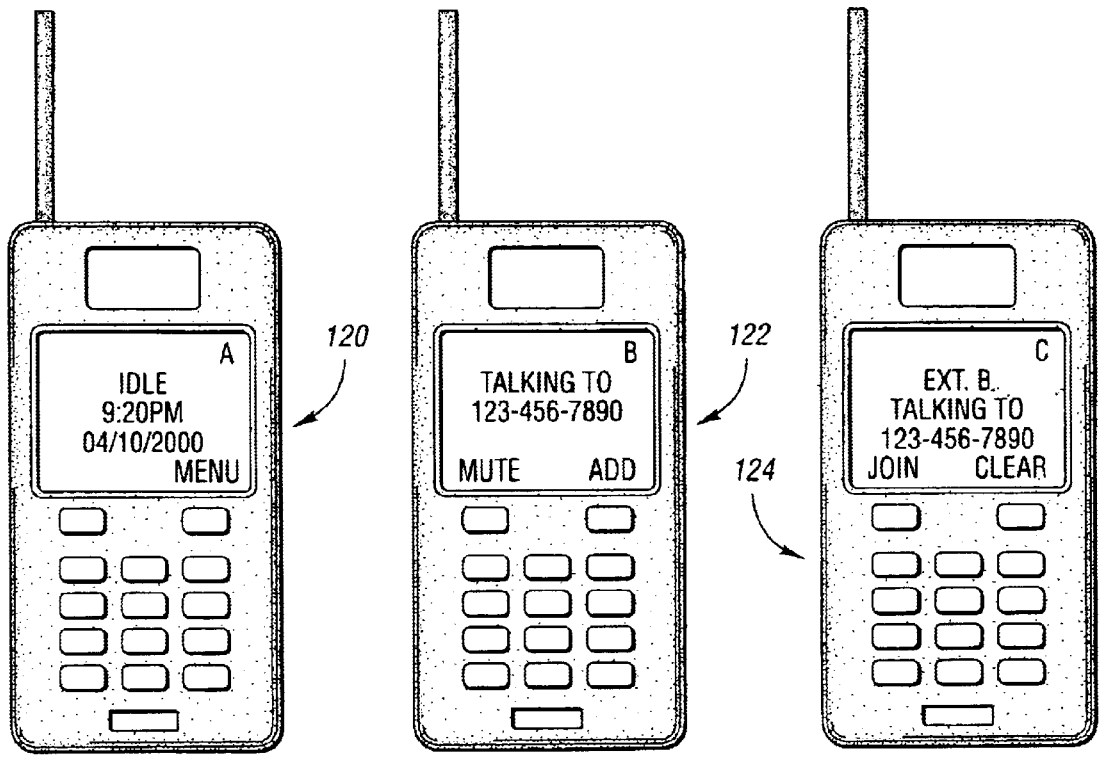

In FIGS. 6A–C, extensions A, B, C are indicated at 120, 122, 124, respectively. Extension A drops off of the call, leaving extension B talking to the incoming caller. As shown, once the user of Extension A drops off the call, all terminals are appropriately signaled and dynamically updated with display status and options appropriate to their status and capabilities. The above example is meant to illustrate the usefulness of having the status of multiple associated wire line and/or wireless terminals, and is not meant to limit embodiments of the present invention. Embodiments of the present invention may be used in a wide variety of applications in which an incoming call is coordinated among a plurality of telephone devices in which the coordinating includes incoming call notification and call status signaling.

Figure 7:
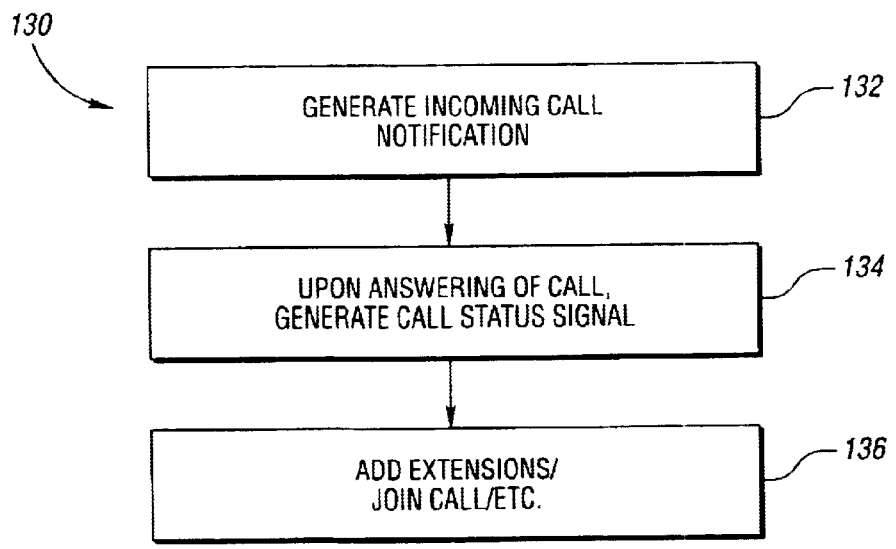
FIG. 7 is a block diagram illustrating a method of the present invention.

In FIG. 7, a block diagram illustrating a method of the present invention is generally indicated at 130. At block 132, an incoming call notification signal is generated. At block 134, upon answering of the call, a call status signal is generated at each telephony device among the group of telephony devices being coordinated. At block 136, the various telephony devices may add extensions to the call, join the call, etc., as understood in the description presented above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of coordinating an incoming call among a plurality of synchronized wireline and wireless telephony devices to provide multiple extensions to cellular users and other users that do not remain in one location, the method comprising:

in the presence of the incoming call, generating an incoming call notification signal indicating caller identity at each telephony device; and upon answering of the incoming call at an answering telephony device of the plurality of wireline and wireless telephony devices, determining a call status of the answered call, including identification of the caller and the answering telephony device, generating a call status signal at each telephony device, including identification of the caller, identification of the answering telephony device, an add prompt at the answering telephony device, and a join prompt at each non-answering telephony device, to inform a user of a status of the answered call, the add prompt allowing a user at the answering telephony device to select a different telephony device, the join prompt allowing a user at a non-answering telephony device to request to join the call, the status signal thereby generated to provide synchronized multiple extension coordination of an incoming call among a plurality of telephony devices.

2. The method of claim 1 wherein generating the call status signal at each telephony device further comprises:

in response to triggering the add prompt, generating an incoming call signal at the selected different telephony device.

3. The method of claim 1 wherein the plurality of telephony devices share a single telephone number.

4. The method of claim 1 wherein the call status signal includes a visual signal.

5. The method of claim 4 wherein each telephony device has a device type and wherein the visual signal is based in part on the device type.

6. The method of claim 1 wherein generating the call status signal at each telephony device further comprises:

in response to a request to join the call at the join prompt, adding the non-answering telephony device to the call.

7. A system for coordinating an incoming call among a plurality of synchronized wireline and wireless telephony devices to provide multiple extensions to cellular users and other users that do not remain in one location, the system comprising:

a plurality of wireline and wireless telephony devices sharing a telephone number, each telephony device being programmed to, in the presence of the incoming call, generate an incoming call notification signal, including user identification, and to, upon answering of the incoming call at an answering telephony device of the plurality of telephony devices, determine a status of the answered call, including identification of the caller and the answering telephony device, generate a call status signal, including identification of the caller and the answering telephony device, an add prompt at the answering telephony device, and a join prompt at a non-answering telephony device, to inform the user of a status of the answered call, the add prompt allowing a user at the answering telephony device to select a different telephony device, the join prompt allowing a user at a non-answering telephony device to request to join the call, the status signal thereby generated to provide synchronized multiple extension coordination of an incoming call among a plurality of telephony devices.

8. The system of claim 7 wherein the plurality of telephony devices share at least one physical telephone line.

9. The system of claim 7 wherein at least one telephony device includes a display screen and the call status signal includes a visual signal.

10. A telephony device for coordinating an incoming call among a plurality of synchronized wireline and wireless telephony devices sharing a telephone number, the telephony device comprising:

a telephone programmed to, in the presence of the incoming call, generate an incoming call notification signal including caller identity and to, upon answering of the incoming call at an answering telephony device of the plurality of synchronized wireline and wireless telephony devices, generate a call status signal to inform a user of a status of the answered call, the call status signal indicating the caller identity and the answering telephony device, the telephone being further programmed to generate an add prompt when the telephone is the answering telephony device to allow the user to select a different telephony device, and to, in response to selection of a different telephony device at the add prompt, communicate an incoming call signal to the selected different telephony device.

* * * * *